(12) United States Patent  
Mccarthy, Jr.

(10) Patent No.: US 12,448,908 B2
(45) Date of Patent: Oct. 21, 2025

(54) AFTERTREATMENT HEAT UP STRATEGIES

(71) Applicant: Eaton Intelligent Power Limited, Dublin (IE)

(72) Inventor: James E. Mccarthy, Jr., Kalamazoo, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1 day.

(21) Appl. No.: 18/717,583

(22) PCT Filed: Dec. 8, 2022

(86) PCT No.: PCT/EP2022/025561
§ 371 (c)(1),
(2) Date: Jun. 7, 2024

(87) PCT Pub. No.: WO2023/104339
PCT Pub. Date: Jun. 15, 2023

(65) Prior Publication Data
US 2025/0052180 A1  Feb. 13, 2025

Related U.S. Application Data

(60) Provisional application No. 63/287,156, filed on Dec. 8, 2021, provisional application No. 63/287,498, filed on Dec. 8, 2021.

(51) Int. Cl.
*F01N 3/20* (2006.01)
*F01N 11/00* (2006.01)
*F02D 13/02* (2006.01)

(52) U.S. Cl.
CPC ......... *F01N 3/2013* (2013.01); *F01N 3/2066* (2013.01); *F01N 11/005* (2013.01);
(Continued)

(58) Field of Classification Search
CPC combination set(s) only.
See application file for complete search history.

(56) References Cited

U.S. PATENT DOCUMENTS 5,492,190 A  2/1996 Yoshida
5,553,451 A  9/1996 Harada
(Continued)

FOREIGN PATENT DOCUMENTS

DE  19548120 C1  1/1997
DE  102017130695 A1  6/2019
(Continued)

OTHER PUBLICATIONS

First Office Action issued in U.S. Appl. No. 18/077,625, mailed May 11, 2023, 15 pages.
(Continued)

*Primary Examiner* — Binh Q Tran
(74) *Attorney, Agent, or Firm* — Talem IP Law, LLP

(57) ABSTRACT

A method of controlling temperature of an engine aftertreatment system includes directing an exhaust heating device in an engine aftertreatment system to apply heat to the engine aftertreatment system; opening at least one of one or more intake valves and one or more exhaust valves of an engine coupled to the engine aftertreatment system; and pulsing, by an engine starter of the engine, the engine to generate airflow from the engine that moves the applied heat from the exhaust heating device downstream the engine aftertreatment system.

19 Claims, 16 Drawing Sheets

(52) U.S. Cl.
CPC ...... *F01N 2240/16* (2013.01); *F01N 2410/06* (2013.01); *F01N 2430/10* (2013.01); *F01N 2560/06* (2013.01); *F01N 2560/07* (2013.01); *F01N 2590/11* (2013.01); *F01N 2900/0416* (2013.01); *F01N 2900/08* (2013.01); *F01N 2900/1404* (2013.01); *F01N 2900/1602* (2013.01); *F02D 13/0203* (2013.01); *F02D 13/0261* (2013.01); *F02D 13/0265* (2013.01)

(56) References Cited

U.S. PATENT DOCUMENTS

| | | | |
|---|---|---|---|
| 5,588,291 | A | 12/1996 | Maus et al. |
| 5,634,330 | A | 6/1997 | Achleitner et al. |
| 5,979,158 | A | 11/1999 | Kaiser et al. |
| 6,003,304 | A | 12/1999 | Swanson et al. |
| 6,151,890 | A * | 11/2000 | Hoshi .................. F01N 13/009 60/303 |
| 7,367,179 | B2 | 5/2008 | Frank et al. |
| 8,327,622 | B2 | 12/2012 | Sano et al. |
| 8,413,423 | B2 | 4/2013 | Roos et al. |
| 8,604,811 | B2 | 12/2013 | Kawase et al. |
| 8,756,924 | B2 | 6/2014 | Gonze et al. |
| 8,783,016 | B2 | 7/2014 | Gonze et al. |
| 8,843,260 | B2 | 9/2014 | Fukuzawa |
| 8,989,935 | B2 | 3/2015 | Martin et al. |
| 9,067,583 | B2 | 6/2015 | Taguchi |
| 9,174,625 | B2 | 11/2015 | Baum et al. |
| 9,388,722 | B2 | 7/2016 | Gonze et al. |
| 10,934,918 | B1 | 3/2021 | Goffe et al. |
| 11,148,654 | B2 | 10/2021 | McCarthy, Jr. |
| 11,193,438 | B1 * | 12/2021 | Zhang .................. F01N 13/0097 |
| 11,326,493 | B2 | 5/2022 | Swart et al. |
| 11,391,192 | B1 | 7/2022 | Harris et al. |
| 11,428,133 | B2 | 8/2022 | Light-Holets et al. |
| 11,473,470 | B2 | 10/2022 | Webb et al. |
| 11,499,463 | B2 | 11/2022 | Swart et al. |
| 11,814,033 | B2 | 11/2023 | McCarthy, Jr. et al. |
| 12,071,884 | B2 | 8/2024 | McCarthy, Jr. et al. |
| 2006/0278449 | A1 | 12/2006 | Torre-Bueno |
| 2008/0282673 | A1 | 11/2008 | Gonze et al. |
| 2009/0282812 | A1 | 11/2009 | Hu |
| 2011/0258984 | A1 | 10/2011 | Santoso et al. |
| 2012/0144826 | A1 * | 6/2012 | Rebhan ............... F02D 41/0007 60/611 |
| 2012/0173062 | A1 | 7/2012 | Madurai Kumar et al. |
| 2015/0075143 | A1 | 3/2015 | Gong et al. |
| 2015/0168260 | A1 | 6/2015 | Adams et al. |
| 2016/0032803 | A1 | 2/2016 | Ettireddy et al. |
| 2018/0094556 | A1 * | 4/2018 | Kurtz ...................... F01N 3/027 |
| 2018/0156144 | A1 | 6/2018 | Inoue et al. |
| 2018/0334939 | A1 | 11/2018 | Mital et al. |
| 2019/0145331 | A1 * | 5/2019 | Dudar ................. F02D 41/0007 123/519 |
| 2019/0186316 | A1 | 6/2019 | Ono et al. |
| 2020/0102874 | A1 | 4/2020 | Kurtz et al. |
| 2020/0102925 | A1 | 4/2020 | Christl |
| 2020/0114897 | A1 | 4/2020 | McCarthy, Jr. |
| 2020/0217234 | A1 | 7/2020 | Huang et al. |
| 2020/0240306 | A1 | 7/2020 | Osemann |
| 2020/0271046 | A1 * | 8/2020 | Kelly ...................... F02B 37/10 |
| 2021/0339734 | A1 | 11/2021 | Boiarciuc |
| 2021/0372312 | A1 | 12/2021 | Light-Holets et al. |
| 2022/0025802 | A1 | 1/2022 | Webb et al. |
| 2022/0065150 | A1 | 3/2022 | Robinson et al. |
| 2022/0136421 | A1 | 5/2022 | Luo et al. |
| 2022/0145790 | A1 * | 5/2022 | Leone ..................... F01N 3/225 |
| 2022/0268193 | A1 | 8/2022 | Punde et al. |
| 2022/0333518 | A1 | 10/2022 | Nau |
| 2023/0094717 | A1 | 3/2023 | Hirooka et al. |

FOREIGN PATENT DOCUMENTS

| | | |
|---|---|---|
| DE | 112018000751 T5 | 11/2019 |
| WO | 2020192973 A1 | 10/2020 |
| WO | 2021242228 A1 | 12/2021 |

OTHER PUBLICATIONS

First Office Action issued in U.S. Appl. No. 18/077,755, mailed Jul. 11, 2023, 11 pages.
International Search Report and Written Opinion issued in International Application No. PCT/EP2022/025558, mailed Feb. 6, 2023, 9 pages.
International Search Report and Written Opinion issued in International Application No. PCT/EP2022/025559, mailed Feb. 6, 2023, 9 pages.
International Search Report and Written Opinion issued in International Application No. PCT/EP2022/025560, mailed Feb. 6, 2023, 9 pages.
International Search Report and Written Opinion issued in International Application No. PCT/EP2022/025561, mailed Feb. 6, 2023, 11 pages.
International Search Report and Written Opinion issued in International Application No. PCT/EP2022/025563, mailed Feb. 6, 2023, 10 pages.
Office Action issued in U.S. Appl. No. 18/717,664, Mailed Dec. 4, 2024, 17 pages.
Second Office Action issued in U.S. Appl. No. 18/077,755, mailed Aug. 23, 2023, 14 pages.
Office Action issued in U.S. Appl. No. 18/717,622, mailed Feb. 12, 2025, 9 pages.
Office Action issued in U.S. Appl. No. 18/732,195, mailed Jan. 28, 2025, 12 pages.
Notice of Allowance issued in U.S. Appl. No. 18/732,195, mailed Aug. 28, 2025, 9 pages.

* cited by examiner

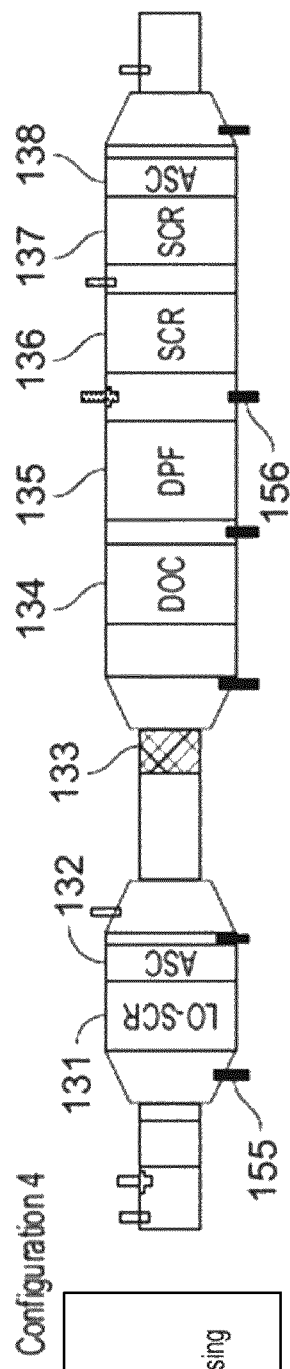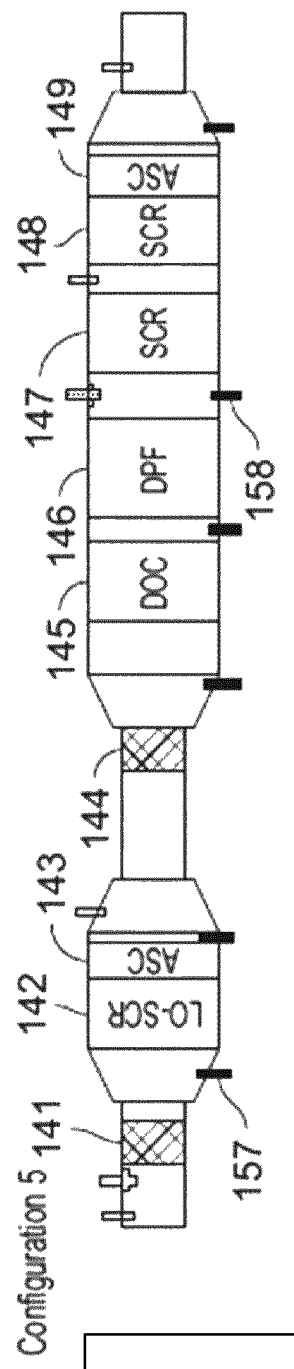
FIG. 1D
FIG. 1E

Tailpipe CO₂ Contribution Differences

| CO₂ Contribution and Differences | | | | | | Relative Difference | | | | |
|---|---|---|---|---|---|---|---|---|---|---|
| | Q1 | Q2 | Q3 | Q4 | Total | Q1 | Q2 | Q3 | Q4 | Total |
| Reference - No Burner | 2.29 | 3.37 | 9.38 | 2.20 | 17.24 | - | - | - | - | - |
| Burner, 53 kW; SCR Thr: 200 C | 2.48 | 3.40 | 9.40 | 2.23 | 17.52 | 8.7% | 1.0% | 0.2% | 1.3% | 1.6% |
| Burner, 53 kW; SCR Thr: 220 C | 2.52 | 3.48 | 9.38 | 2.22 | 17.60 | 10.2% | 3.3% | 0.0% | 0.8% | 2.1% |
| Burner, 53 kW; SCR Thr: 240 C | 2.52 | 3.55 | 9.38 | 2.28 | 17.74 | 10.4% | 5.4% | 0.0% | 3.5% | 2.9% |
| Burner, 53 kW; SCR Thr: 190 C | 2.38 | 3.38 | 9.37 | 2.23 | 17.37 | 4.3% | 0.4% | -0.1% | 1.2% | 0.7% |
| Burner, 35 kW; SCR Thr: 200 C | 2.45 | 3.40 | 9.38 | 2.23 | 17.46 | 7.0% | 0.9% | -0.1% | 1.4% | 1.3% |
| Burner, 53 kW; SCR Thr: 400 C-200 C | 2.55 | 3.28 | 9.31 | 2.18 | 17.31 | 11.4% | -2.7% | -0.8% | -1.2% | 0.4% |

FIG. 4C

AFTERTREATMENT HEAT UP STRATEGIES

CROSS-REFERENCE TO RELATED APPLICATIONS

This application is the U.S. National Stage Application of International Application No. PCT/EP2022/025561, filed Dec. 8, 2022, which claims the benefit of U.S. Provisional Patent Application Ser. No. 63/287,156, filed Dec. 8, 2021, and U.S. Provisional Patent Application Ser. No. 63/287,498, filed Dec. 8, 2021, which are hereby incorporated by reference in their entirety.

BACKGROUND

In the United States and elsewhere, current engine designs are required to lower emissions and improve fuel economy. The addition of the low load cycle (LLC), in-use emissions compliance, and extended idle operation increase this level of stringency. One of the challenges in lowering emissions is to effectively manage emissions at engine start-up. One approach is to include engine aftertreatment systems. As is known, nitrogen oxides ($NO_x$) aftertreatment systems are temperature sensitive. High $NO_x$ conversion begins between 200° C. and 280° C., depending on catalyst formulation. Typically, at engine start-up, idle exhaust temperatures can be between 110° C. and 150° C. In this regard, an amount of time is needed for the exhaust to heat up from the typical exhaust temperatures to the elevated temperatures that satisfy the desired 95% (or above) efficiency target.

Exhaust Thermal Management for diesel aftertreatment (AT) systems is beneficial for cold start engine operations. Pre-heating the AT system using an exhaust heating device (fuel burner or e-Heater) can be done. However, the heat build-up caused by the exhaust heating device benefits from air flow through the exhaust system. One method of generating air flow through the exhaust system is adding an external blower, which moves heat down through the aftertreatment system. Adding an external blower increases vehicle weight, takes up unnecessary vehicle space, and increases part cost. Therefore, there is a need for improved methods of transferring heat from exhaust heating device through the aftertreatment system that eliminates the need for an external blower.

BRIEF SUMMARY

Aftertreatment heat up strategies are described. Aftertreatment systems rely on both heat (e.g., heat applied via an exhaust heating device) and airflow (traditionally provided by an external blower). The airflow helps regulate the heat of the aftertreatment system, especially where excess heat has built up.

A method of controlling temperature of an engine aftertreatment system includes directing an exhaust heating device in the engine aftertreatment system to apply heat to an engine aftertreatment system; opening at least one of one or more intake valves and one or more exhaust valves of an engine coupled to the engine aftertreatment system; and pulsing, by an engine starter of the engine, the engine to generate airflow from the engine that moves the applied heat from the exhaust heating device downstream the engine aftertreatment system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A-1E illustrate examples of compatible aftertreatment heating configurations.

FIG. 3A shows plots illustrating effect on exhaust temperature vs. time with application of a two-tier strategy in accordance with the subject disclosure. FIG. 3B shows plots of SCR inlet temperature vs. time comparing different approaches. FIG. 3C shows plots of SCR average temperature over time comparing different approaches.

FIG. 4A-4C show plots from test runs for a HOT Federal Test Procedure (FTP) cycle. FIG. 4A shows a plot of tailpipe (TP) $CO_2$ vs. TP $NO_x$. FIG. 4B shows a plot of tailpipe $NO_x$ mass vs. time. FIG. 4C illustrates a table showing tailpipe $CO_2$ contribution differences.

FIG. 5A shows plots of SCR temperature over time and tailpipe $NO_x$ over time for comparing burner operation to no burner operation. FIG. 5B shows a plot of aftertreatment system temperatures (and flow rate) vs. time.

DETAILED DESCRIPTION

Aftertreatment heat up strategies are described. Aftertreatment systems rely on both heat (e.g., heat applied via an exhaust heating device) and airflow (traditionally provided by an external blower). The airflow helps regulate the heat of the aftertreatment system, especially where excess heat has built up.

An aftertreatment heat up strategy in accordance with certain embodiments herein can more closely control the temperature of the aftertreatment system, resulting in better control for pollution collection characteristics of the exhaust aftertreatment. Such a strategy can be characterized pulsing an engine coupled to the engine aftertreatment system to generate airflow from the engine that moves the applied heat from an exhaust heating device, such as an electric heater (e-Heater), downstream the engine aftertreatment system. This strategy of providing airflow can be applied with a 2-tier ("two-tier") heating strategy, involving controlling the e-Heater or other exhaust heating device in two tiers such that there is more than one setpoint temperature for the exhaust heating device.

In a first aspect, it can be possible to heat up an aftertreatment before the engine has cranked to a combustion mode. Before idle combustion is achieved, a pre-heating method can be implemented. Then, a tiered heating strategy, as explained in further detail herein, can be implemented to either further heat the aftertreatment or to maintain the heat up.

Therefore, methods and systems for pre-heating a diesel exhaust aftertreatment system can be implemented.

Pre-heating a diesel exhaust aftertreatment system can be performed using either a fuel burner or e-Heater combined with the engine as the air pump. An engine starter can be controlled to facilitate the method.

As discussed above, Exhaust Thermal Management for Diesel aftertreatment (AT) is beneficial for cold start operations. Pre-heating the AT system using an exhaust heating device (fuel burner or e-Heater) can be done. The heat build-up caused by the exhaust heating device can benefit from air flow through the exhaust system. One method is to add an external blower with the exhaust heating device to move heat down through the aftertreatment system. However, instead of requiring an external blower, advantageously, this disclosure indicates that the engine starter, without an external blower, can be used in a pulsed fashion to move heat downstream.

FIGS. 1A-1E illustrate examples of compatible aftertreatment heating configurations. Configurations 1-5, which correspond to FIGS. 1A-1E, are working examples with an e-Heater as the exhaust heating device in an exhaust system upstream of an SCR. The illustrated aftertreatment configurations connect to an engine exhaust to provide aftertreatment.

Figure 1A:
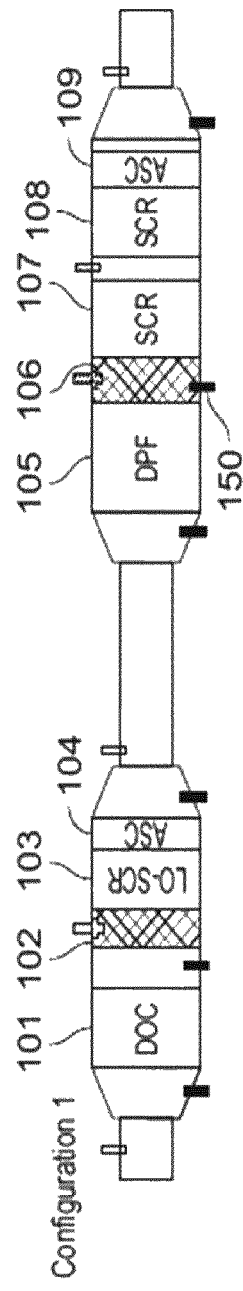

Referring to FIG. 1A, Configuration 1 includes, for an output of an engine, a diesel oxidation catalyst (DOC) 101, a first e-Heater 102, a light-off selective catalytic reduction (LO-SCR) 103, a first ammonia slip catalyst (ASC) 104, a diesel particulate filter (DPF) 105, a second e-Heater 106, a first SCR 107, a second SCR 108, and a second ASC 109.

Figure 1B:
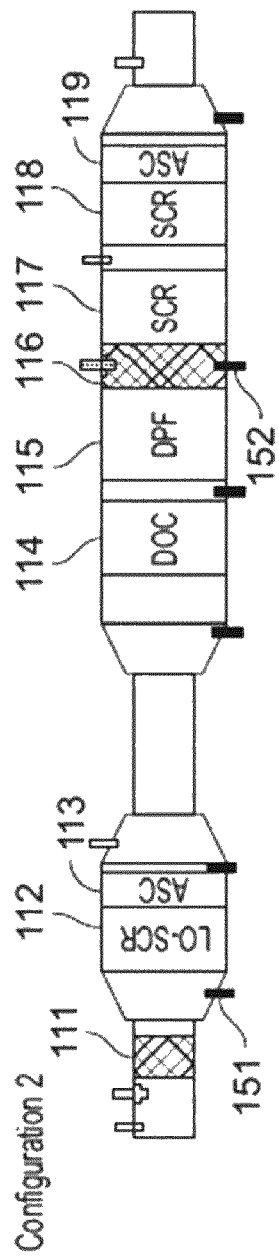

Referring to FIG. 1B, Configuration 2 includes, for an output of an engine, a first e-Heater 111, a LO-SCR 112, a first ASC 113, a DOC 114, a DPF 115, a second e-Heater 116, a first SCR 117, a second SCR 118, and a second ASC 119.

Figure 1C:
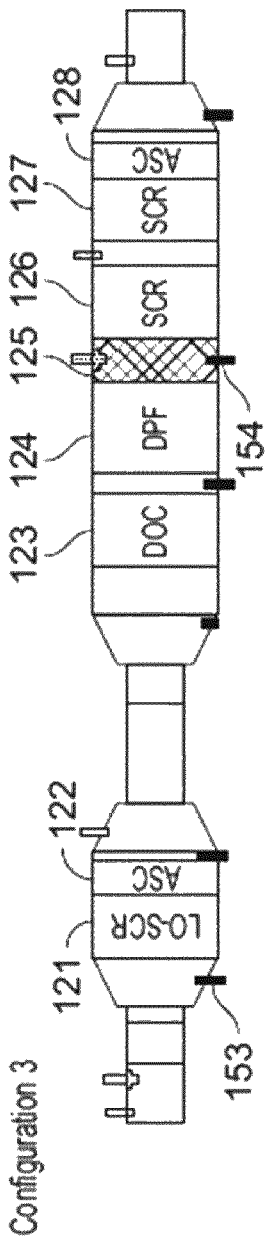

Referring to FIG. 1C, Configuration 3 includes, for an output of an engine, a LO-SCR 121, a first ASC 122, a DOC 123, a DPF 124, an e-Heater 125, a first SCR 126, a second SCR 127, and a second ASC 128.

Referring to FIG. 1D, Configuration 4 includes, for an output of an engine, a LO-SCR 131, a first ASC 132, an e-Heater 133, a DOC 134, a DPF 135, a first SCR 136, a second SCR 137, and a second ASC 138.

Referring to FIG. 1E, Configuration 5 includes, for an output of an engine, a first e-Heater 141, a LO-SCR 142, a first ASC 143, a second e-Heater 144, a DPF 146, a first SCR 147, a second SCR 148, and a second ASC 139.

Heating up the light-off Selective Catalytic Reduction (LO-SCR) and primary selective catalytic reduction (SCR) is important for $NO_x$ reduction. It is also important to heat the diesel particulate filter (DPF) which is typically in front for the primary SCR since that also needs to be hot to avoid blowing cold air through the SCR.

The engine is used herein as the air pump. For instance, a 15 L engine at a typical engine starting speed (i.e., without fueling the engine) of approximately 135 rpm can provide 74.4 kg/hr air flow. For comparison, one available external blower produces 75 kg/hr air flow. Therefore, these methods provide similar air flow outputs. However, the external blower is an additional part for an original equipment manufacturer (OEM) to install in a diesel system and therefor requires additional cost, system total weight, and space. Therefore, if the engine is used as the air pump, these detriments can be reduced or eliminated.

In the conventional external blower set-up, an exhaust heating device, such as the e-Heater or fuel burner, can be used to pre-heat the AT system. Running two blowers (150 kg/hr) for 2 minutes with one of these exhaust heating devices is enough time to heat up the AT system. The equates to about 5 kg of air. An optimal range for this particular working example can be 5 kg+/−50% (so 2.5 kg to 7.5 kg) of air.

Similarly, when using the engine as an air pump (as opposed to using an external blower set-up) a fuel burner or e-Heater can be used as the AT heat source (e.g., first e-Heater 102 or second e-Heater 106 of FIG. 1A, first e-Heater 111 or second e-Heater 116 of FIG. 1B, e-Heater 125 of FIG. 1C, e-Heater 133 of FIG. 1D, or first e-Heater 141 or second e-Heater 144 of FIG. 1E). Heating can be done during or prior to start-up of the combustion engine, preferably before the combustion process begins so that $NO_x$ and other pollutants can be readily trapped upon engine start-up. Then, the engine starter can be pulsed at the engine starting speed to move the heat downstream in the AT system. The engine starter can be any number of devices, for example, an air starter, an electric motor, or other structure. The engine starter can, as a working example, be powered by the battery.

As a working example, an air starter spins up the engine to 120-150 RPMs. Instead of cylinder deactivation at this stage, a function similar to cylinder cut-out is used: the intake and exhaust valves are held open while fueling is eliminated. The low RPMs differentiate the technique over prior art cylinder cut-out, which is traditionally used at loaded RPMs. The engine acts as an air pump with the pistons reciprocating and the valves held open. The engine is turning ("cranking over") without fuel burning. To continue the working example, it is possible to pulse the engine at a desired starting speed for 5 seconds, then shut it off for 25 seconds such that there are 10 seconds of pulsing every minute. On a 15 L engine, this to the following kg of air at various starting speeds, for example 1.5 kg of air at 100 rpm (5 second pulses every minute for 10 minutes), 2.1 kg of air at 135 rpm (5 second pulses every minute for 10 minutes), 2.3 kg of air at 150 rpm (5 second pulses every minute for 10 minutes), and 3.1 kg of air at 200 rpm (5 second pulses every minute for 10 minutes).

Advantageously, the amount of air pumped under this strategy is in the same ballpark as would be supplied by the external blower, but vehicle weight, vehicle space, and part cost are not added.

Since this is pre-heating, there is no set amount of time prescribed, so pre-heating for 2 to 20 minutes is well within reasonable time frames. An additional example can be seen in Table 1 below:

TABLE 1

| | |
|---|---|
| 135 | rev/min |
| 15 | L |
| 1012.5 | L/min |
| 1.225 | kg/m³ |
| 0.001225 | kg/L |
| 1.240313 | kg/min |
| 74.41875 | kg/hr |

Table 1 illustrates airflow results of pulsing a 15 L engine. As seen in Table 1, pulsing, by an engine starter of the engine, the engine to generate airflow on a 15 L engine (pulsed at 135 rev/min) generates airflow of 74.4175 kg/hr (i.e., 1.225 kg/m³, 0.001225 kg/L, and 1.240313 kg/min.)

The exhaust heating device heats up the air in the exhaust, then moves the heat downstream with the engine starter cycle and repeats.

If this technique were to be applied to a hybrid vehicle, then additional considerations can be made. For example, higher starting speeds could be considered. For example, spinning the engine at 550 rpm yields 303 kg/hr air flow, which is equivalent to external blowers. In this scenario, it may be possible to conduct all of the pre-heating in about 1 minute. As another example, a hybrid-electric vehicle that cranks-over at 600 RPMs does not need to be pulsed as often as a diesel engine cranking over at 100-150 RPMs.

Then, tiered heat up strategies can be implemented.

Selective Catalytic Reduction (SCR) is an active emissions control technology system that reduces tailpipe emissions of nitrogen oxides (NOx). The functionality of the SCR is limited by temperature of the system. As mentioned above, during cold start operations, the exhaust temperatures may be too low. Thus, the SCR must be pre-heated for the desired NOx reduction to occur. However, the SCR can also become overheated, reducing the SCR's effectiveness. It has been found that heating the SCR at a single temperature setpoint can lead to overheating. The current temperature regulation of the SCR is insufficient to meet upcoming NOx regulations. There is a need to effectively control the temperature of the SCR to maintain ideal temperature conditions to increase SCR effectiveness.

An aftertreatment heat up strategy in accordance with certain embodiments herein can more closely control the pollution collection characteristics of the aftertreatment. Such a strategy can be characterized as a 2-tier ("two-tier") heating strategy. In particular, the heating strategy involves controlling an e-Heater or other exhaust heating device in two tiers such that there is more than one temperature setpoint for the exhaust heating device.

The described 2-tier heating strategy can be applied to an exhaust heating device such as an electric heater (e-Heater). The e-Heater can be upstream of certain pollution collection substrates, for example, the SCR, which can collect NOx or CO2 pollutants as a substrate.

An aftertreatment heat up strategy can more closely control the pollution collection characteristics of the aftertreatment.

Figure 2:
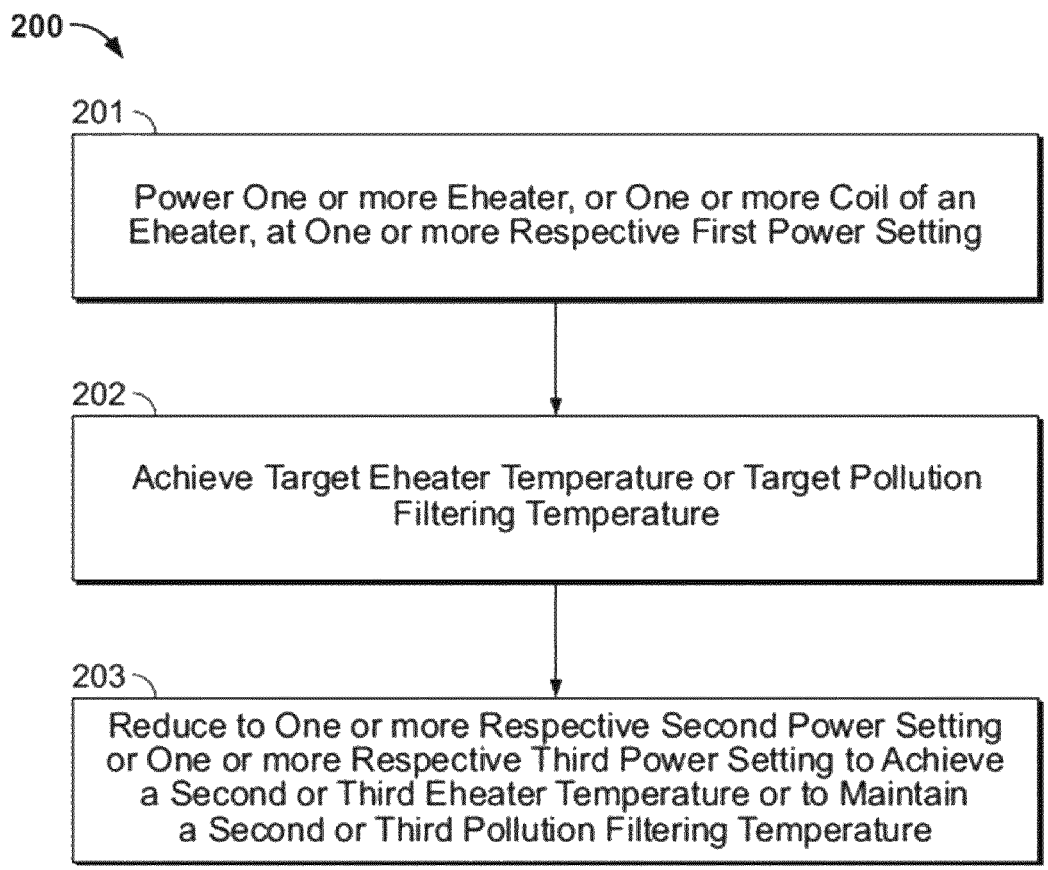
FIG. 2 illustrates an example method of controlling an exhaust heating device in an aftertreatment system.

FIG. 2 illustrates an example method of controlling an exhaust heating device in aftertreatment system. Method 200 illustrates the two-tier strategy, which can be applied to a heater in aftertreatment systems, including the configurations shown in FIGS. 1A-1E. Referring to FIG. 2, the method 200 includes powering (201) one or more e-Heater, or one or more coil of an e-Heater, at one or more respective first power settings; achieving (202) target e-Heater temperature or target pollution filtering temperature; and reducing (203) to one or more respective second power setting or one or more respective third power setting to achieve a second or third e-Heater temperature or to maintain a second or third pollution filtering temperature.

Following this procedure, but in a more nuanced and controlled method, as illustrated in the examples below, SCR temperature can be controlled with more accuracy.

In particular, a method of controlling temperature of an engine aftertreatment system includes: directing an exhaust heating device in the engine aftertreatment system to apply heat using a first temperature setpoint; while applying the heat at the first temperature setpoint, receiving temperature data from a temperature sensor (e.g., sensor 150 of FIG. 1A, sensor 151 or sensor 152 of FIG. 1B, sensor 153 or sensor 154 of FIG. 1C, sensor 155 or sensor 156 of FIG. 1D, sensor 157 or sensor 158 of FIG. 1E) proximate to a SCR device (e.g., SCR 107 of FIG. 1A, LO-SCR 112 or SCR 117 of FIG. 1B, LO-SCR 121 or SCR 126 of FIG. 1C, LO-SCR 131 or SCR 136 of FIG. 1D, LO-SCR 142 or SCR 147 of FIG. 1E) in the engine aftertreatment system; determining from the temperature data that a first temperature is at a first threshold temperature which is less than the first temperature setpoint; and after determining that the first temperature is at the first threshold temperature, directing the exhaust heating device to apply heat using a second temperature setpoint which is less than the first temperature setpoint.

The diesel particulate filter (DPF) (e.g., DPF 105 of FIG. 1A, DPF 115 of FIG. 1B, DPF 124 of FIG. 1C, DPF 135 of FIG. 1D, DPF 146 of FIG. 1E) is a large thermal mass that needs to heat up before a substantial heat flux can be transferred downstream. By incorporating the systems and methods described herein, the DPF can be used to assist in heating the SCR by heating up the DPF first by setting a higher SCR temperature setpoint. Then, the SCR temperature setpoint can be lowered.

For a Heavy-duty engine, an initial setpoint between 30° and 400° C. is desired. This strategy treats the DPF (or DOC+DPF) as a thermal reservoir. The goal is to Heat up the reservoir such that it can heat the SCR downstream.

The method 200 of FIG. 2 can apply to Cold operation (start-up) and even Hot operation (when the SCR is too cold). This means that the system and strategy can be implemented during start-up or during regular operation.

One advantage of this high burner heat flux is that it can shorten the time that the engine spends in its "thermal management" mode. This mode expends higher fuel than "fuel economy" mode. So, it is desired to switch back to fuel economy mode at the soonest.

In the case that the engine+exhaust heating device heats up the aftertreatment system to its sweet spot temperature range fast enough, there may be a net fuel ($CO_2$) savings as the amount of time spent in "fuel economy" mode shifts to an overall fuel savings over the route (or test cycle). So, for the example of a fuel burner as the exhaust heating device burning an increased amount of fuel to heat up the SCR as the target portion of the aftertreatment system, the overage of fuel in the thermal management mode can be offset by the quick return to fuel economy mode. Otherwise, the fuel burner is used in the fuel economy mode to heat the SCR, resulting in two fuel uses in the same time period.

Using the techniques herein, the optimal SCR temperature is achieved, and the fuel burner can be turned off or set to a lower SCR temperature setpoint during the fuel economy mode. In the case of an e-Heater, there is no fuel use in a fuel burner, but fuel can be used for combustion. Considering the below elevated idle example, which uses more fuel than regular idle, the thermal management mode uses more fuel with the e-Heater to heat up. Therefore, the switch back to fuel economy mode can still result in fuel savings over the route if the SCR is heated faster with the strategies herein than without the exhaust heating device.

Therefore, once the thermal reservoir is heated up using the initial setpoint, the exhaust heating device will switch to a lower SCR temperature setpoint. For the example Heavy-duty engine, this setpoint can be between 19° and 200° C.

In various implementations, the setpoint location can be, for example, the SCR inlet with alternative locations at SCR mid-bed, SCR Avg, DPF Out, and DOC out. Sensors can be installed at the SCR inlet, mid-bed, or inlet & outlet, for example. In some cases, sensors can be located at the DPF outlet or DOC outlet. In some cases, other locations for temperature sensors can be used, with algorithms to calculate the expected temperatures at those locations.

As one strategy, once this new setpoint is achieved, the exhaust heating device can immediately shutoff. In some cases, yet another setpoint can be set for the exhaust heating device.

As mentioned above, the DPF is a thermal reservoir. At the point of the second setpoint being reached, the heat in the DPF is such that the exhaust flow through the DPF will keep the downstream SCR hot and in its desired temperature window.

This strategy of switching from a thermal management mode to a fuel economy mode can be expected to handle all drive cycles after cold start. The strategy can be characterized as having a first tier setpoint for the exhaust heating device and a second tier setpoint for the exhaust heating device to result in a 2-tier aftertreatment heat up strategy.

While it can be possible to set a static operational setpoint for the exhaust heating device, a third-tier control setpoint can be used for selective operational modes. Accordingly, it is also possible to implement a 3-tier aftertreatment heat up strategy where the third tier setpoint is between the high setpoint (e.g., 300-400° C.) and the lower setpoint (e.g., 190-200° C.). This setpoint could be used to ensure that the DPF thermal reservoir stays fully heated for specific engine operating conditions such as 1) engine coasting and 2) extended idle operation. These two modes could deplete the thermal potential of the DPF, since they do not themselves generate high heat. By using the third tier, once the engine shifts to power generation mode again, the SCR will be hot from the third-tier exhaust heating device control strategy. The engine coasting and extended idle operation won't cool down the SCR. Lower than desired $NO_x$ reduction can be avoided. An anticipated setpoint for this middle control level is around 250° C. which could be triggered by extended coast and/or extended idle operation As an additional aftertreatment heat up strategy, the above 2 or 3 tiers could be coupled with "elevated idle." Elevated idle during cold operation increases the "heat flux" to the SCR since more fuel is consumed by the engine coupled with the increased exhaust flow. Elevated Idle increases the RPMs of the engine over a normal idle range (for example, elevating from 600 RPMs regular idle to 800 RPMs "elevated idle"). The elevated idle can be used during Tier 1 or Tier 2 with the exhaust heating device activated. Once the SCR is heated up, elevated idle can be exited. If the diesel engine is still idling, it can return to regular idle. This strategy is beneficial because the increased RPMs of elevated idle could potentially cool the SCR by blowing cold air to the SCR, thus prolonging the need to fuel/power the exhaust heating device. Returning to regular idle decreases air flow from the 800 RPMs engine. Optionally, the second tier can be implemented at regular idle with the third tier implement at elevated idle.

As another alternative, it is possible to implement elevated idle with the engine in cylinder deactivation (CDA) mode during idle. This will increase the engine heat while keeping the fuel consumption lower than "non-CDA" mode.

As one strategy, a distinct setpoint of 400° C. was chosen, but once the SCR hit 300° C., the setpoint was switched to 200° C.

Tests were conducted in accordance with Federal Test Procedures (FTPs), which are provided by the United States Environmental Protection Agency.

Figure 3A:
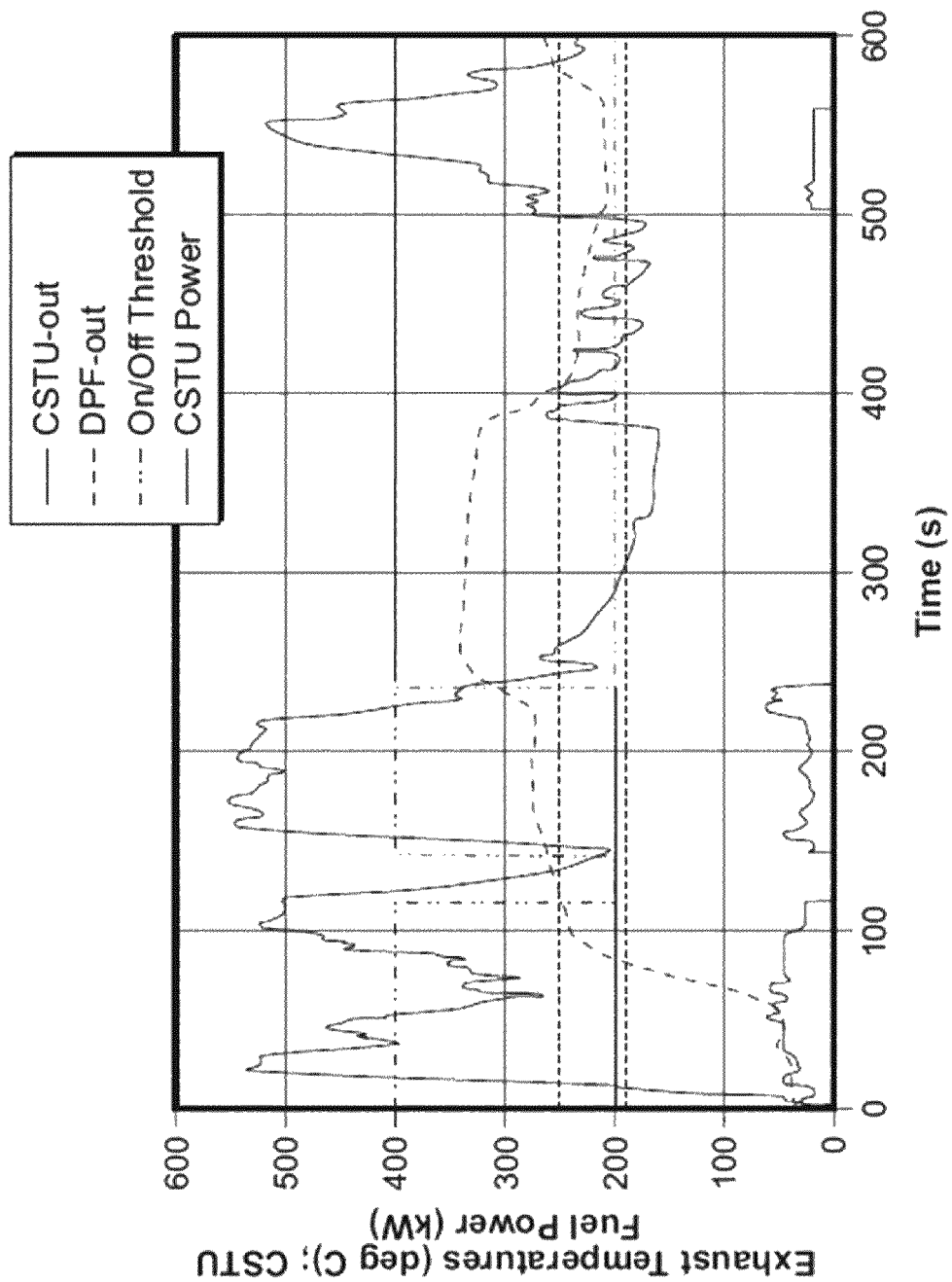
FIGS. 3A-3C show plots from test runs for a COLD FTP cycle.
Figure 3B:
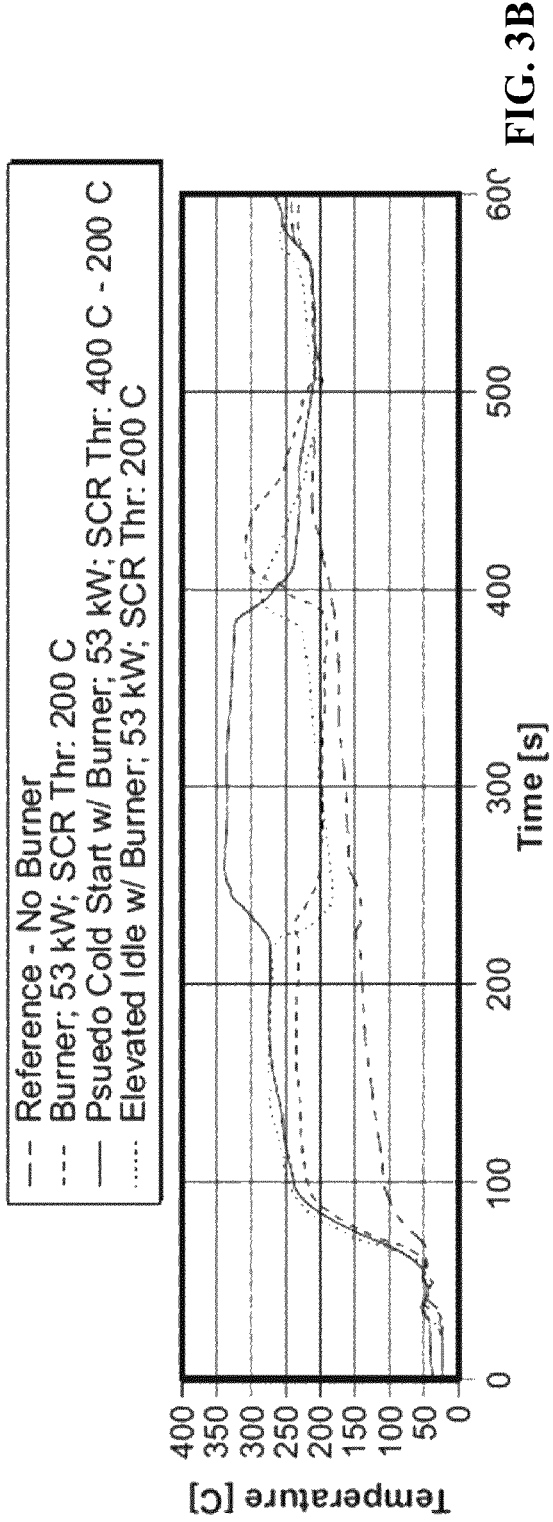
Figure 3C:
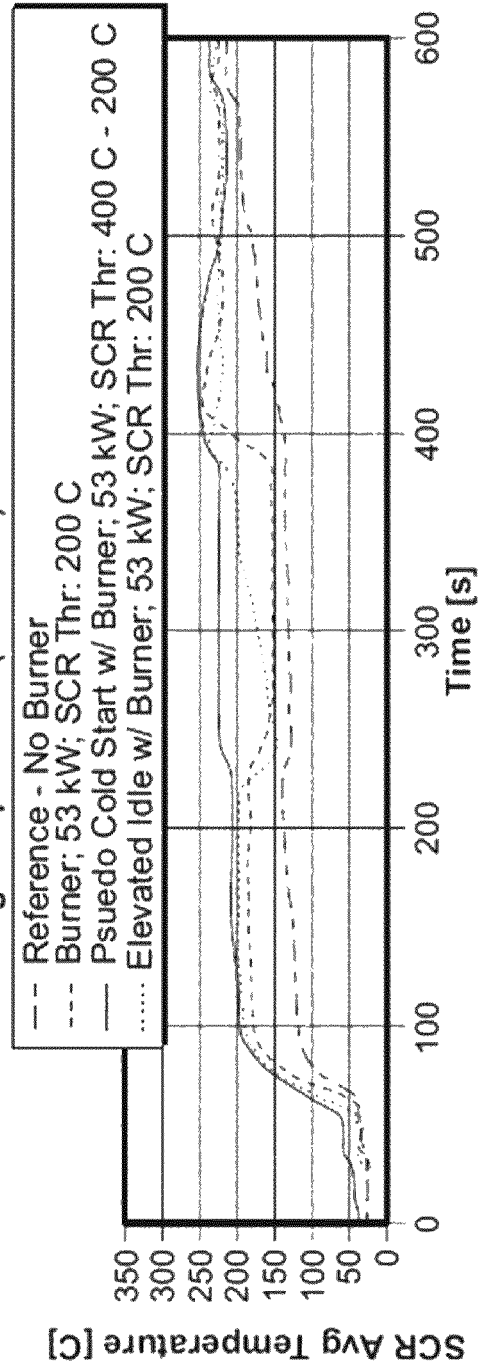

Plots from test runs for a COLD FTP cycle are shown in FIGS. 3A-3C. FIG. 3A shows plots illustrating effect on exhaust temperature vs. time with application of a two-tier strategy in accordance with the subject disclosure, FIG. 3B shows plots of SCR inlet temperature vs. time comparing different approaches, and FIG. 3C shows plots of SCR average temperature over time comparing different approaches.

Referring to FIG. 3A, it can be seen that heat is applied in the engine aftertreatment system using a first temperature setpoint of 400° C. starting at 0 s. Temperature data is shown from a temperature sensor at DPF out/SCR inlet. While applying the heat at the first temperature setpoint, the temperature of the DPF out/SCR inlet increases. When it is detected that the temperature of the DPF out/SCR inlet reaches the threshold temperature switch point of 300° C., a second temperature setpoint of the exhaust heating device is dropped to 200° C. Also shown in the figure is a cold start thermal unit (CSTU) output and CSTU power. CSTU, which is used in the test set up, is a cold start thermal unit air source from Tenneco.

As can be seen in FIGS. 3B and 3C, the two-tier strategy enables higher temperatures during the idle portion of the cycle (250s to 380s). Elevated idle is observed in FIG. 3C to have an increasing SCR average temperature trend during the idle portion.

Figure 4A:
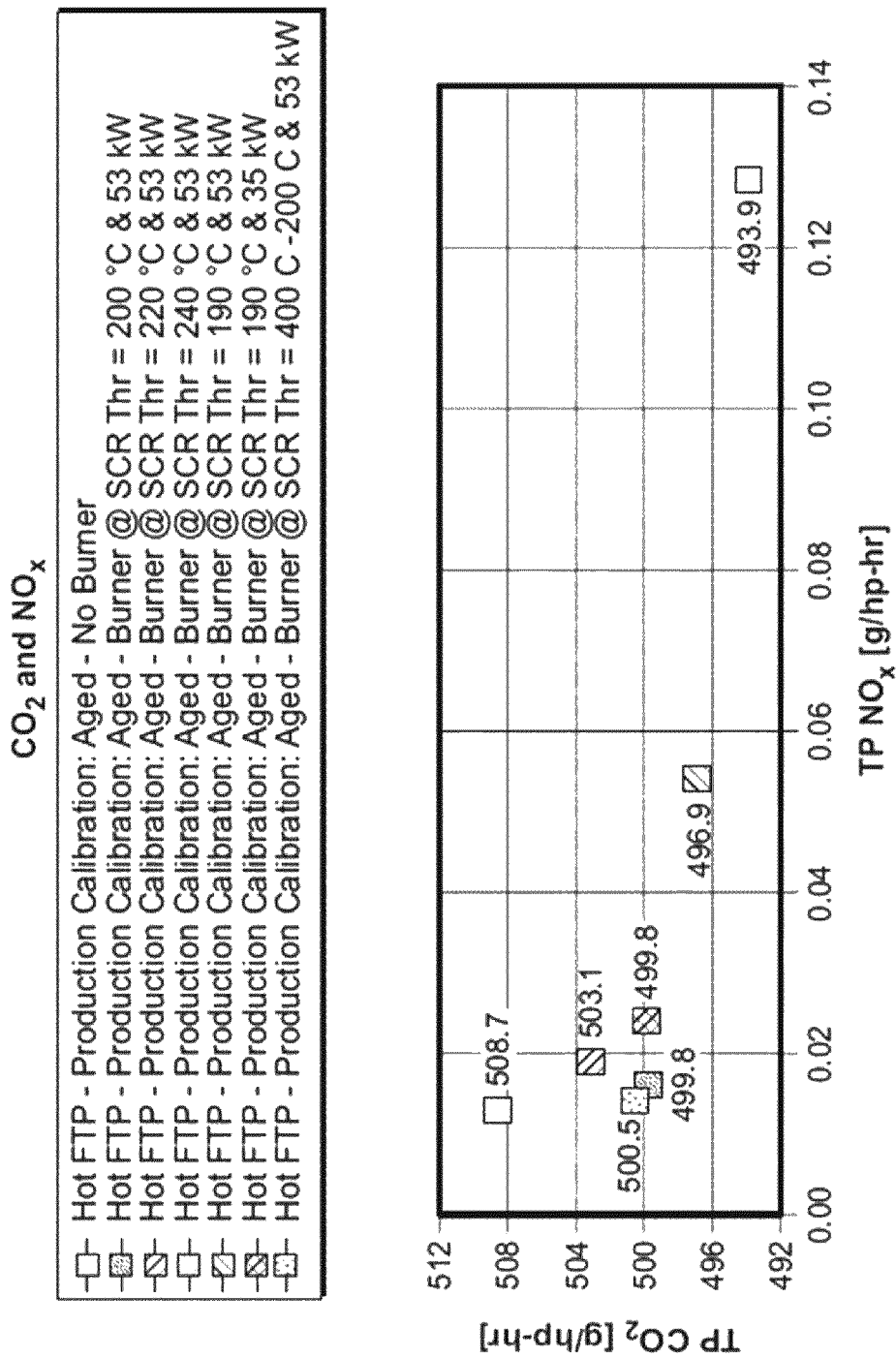
Figure 4B:
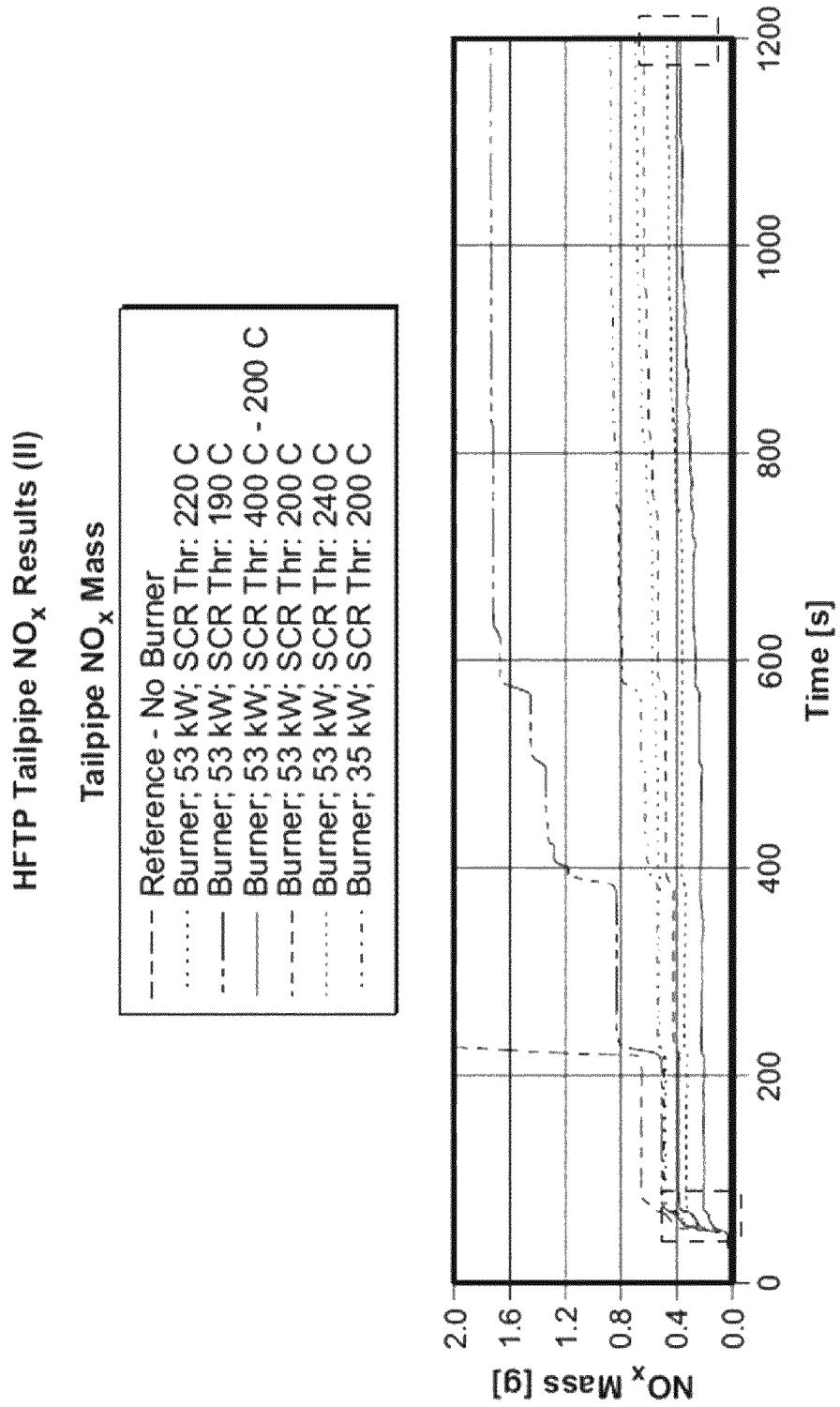

Plots from test runs for a HOT FTP cycle are shown in FIGS. 4A-4C. FIG. 4A shows a comparison plot of tailpipe (TP) $CO_2$ vs. TP $NO_x$ of different configurations. FIG. 4B shows a plot of tailpipe $NO_x$ mass vs. time for different configurations. FIG. 4C illustrates a table showing tailpipe $CO_2$ contribution differences. As can be seen in FIG. 4A, which shows single set-point outcomes versus a 2-tier outcome; the two-tier strategy offered the best trade-off on the HOT FTP for lowest cumulative $NO_x$.

When the engine is experiencing sustained low loads, operation of the exhaust heating device with a single or 2-tier control threshold tied to the DPF-out temperature sensor (or any other temperature further downstream in the system) results in a series of large-amplitude thermal waves passing through the system. This behaviour occurs because of the significant time lag between sensing and actuation, or by analogy, it occurs due to the capacity of the thermal reservoir. The amplitude of these thermal waves can be reduced by tying the threshold to the DOC-out temperature sensor; this effectively reduces the reservoir capacity by more than one-half. A prolonged decease in the engine-out exhaust temperature could be used to trigger shifting the threshold from the DPF-out to the DOC-out sensor.

Figure 5A:
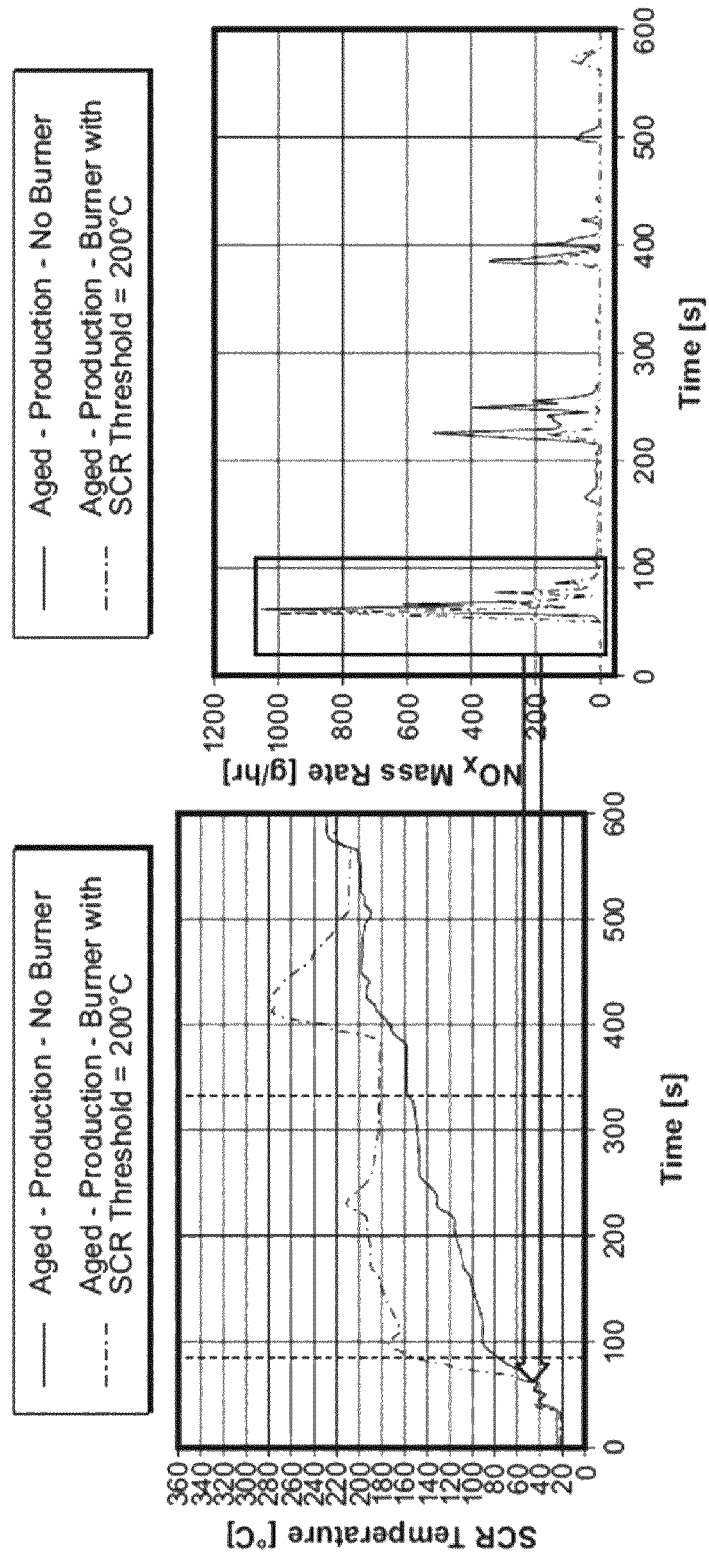
FIGS. 5A and 5B show benefits on COLD FTP.
Figure 5B:
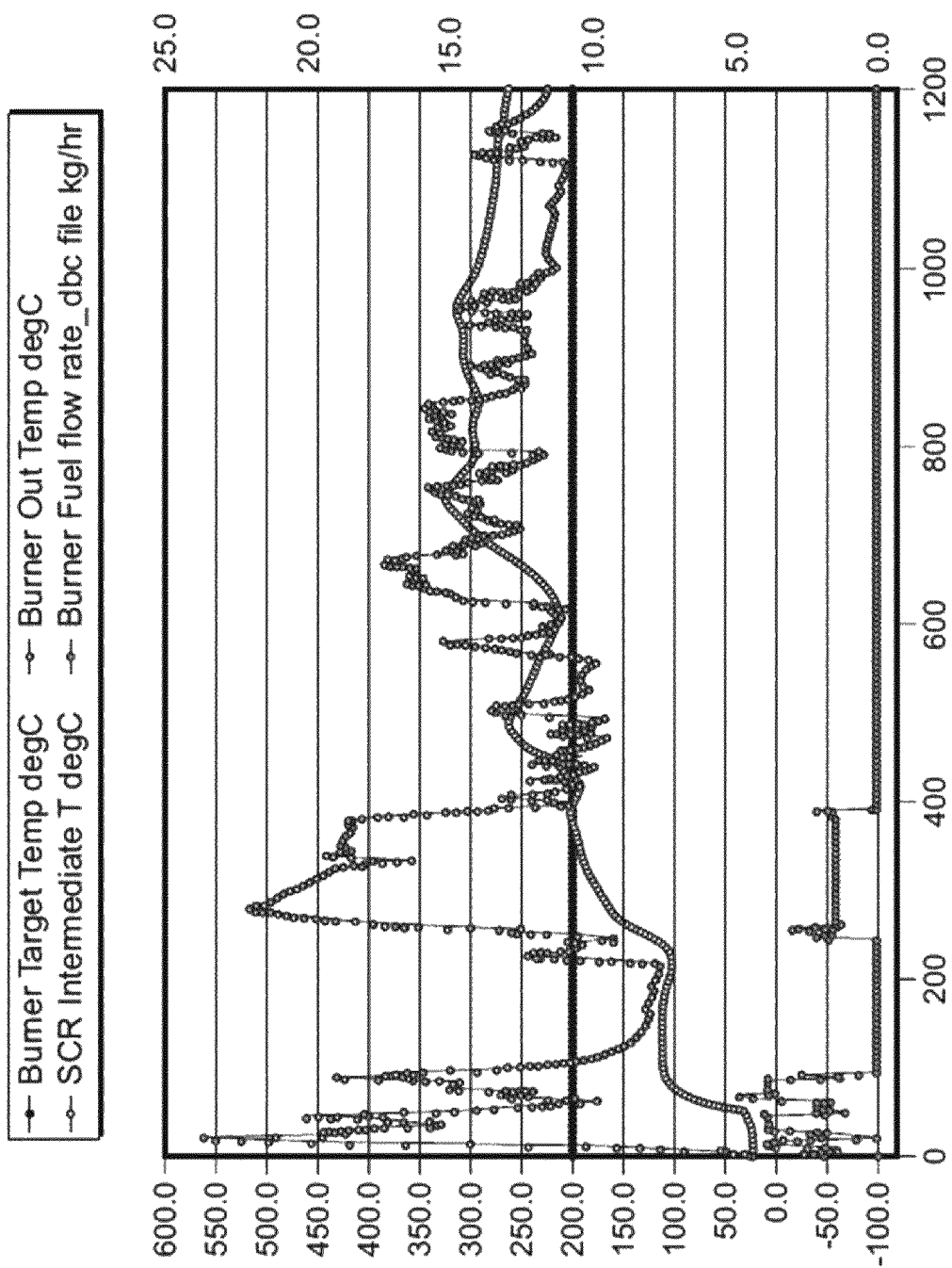

As another articulated control strategy:
Aggressive Burner Heat-Up (ABH): Set SCR Inlet Setpoint to 400° C.
  Exit this mode when the SCR Inlet Temperature Exceed 275° C.
Moderate Burner Heat-Up (MBH): Set SCR Inlet Setpoint to 300° C.
  Enter this mode when exiting ABH
  Exit this mode when SCR Inlet Temperature Exceeds 285° C.
Low Burner Heat-Up (LBH): Set SCR Inlet Setpoint to 200° C.
  Enter this mode when exiting MBH
Additional plots illustrate the benefits on COLD FTP (CFTP). FIGS. 5A and 5B show benefits on COLD FTP. FIG. 5A shows plots of SCR temperature over time and tailpipe $NO_x$ over time for comparing burner operation to no burner operation. FIG. 5B shows a plot of aftertreatment system temperatures (and flow rate) vs. time. As can be seen, the Cold FTP with the fuel burner shows that it takes over 400° C. for the SCR inlet to exceed 240° C. So, to accelerate this heat-up, it is possible to implement 400° C. Setpoint Early to keep burner on at near maximum output. Goal is to exceed 250° C. in less than 60 seconds. Then transition to a lower setpoint=300° C. Then, to a lower level of about 200° C.

Figure 6:
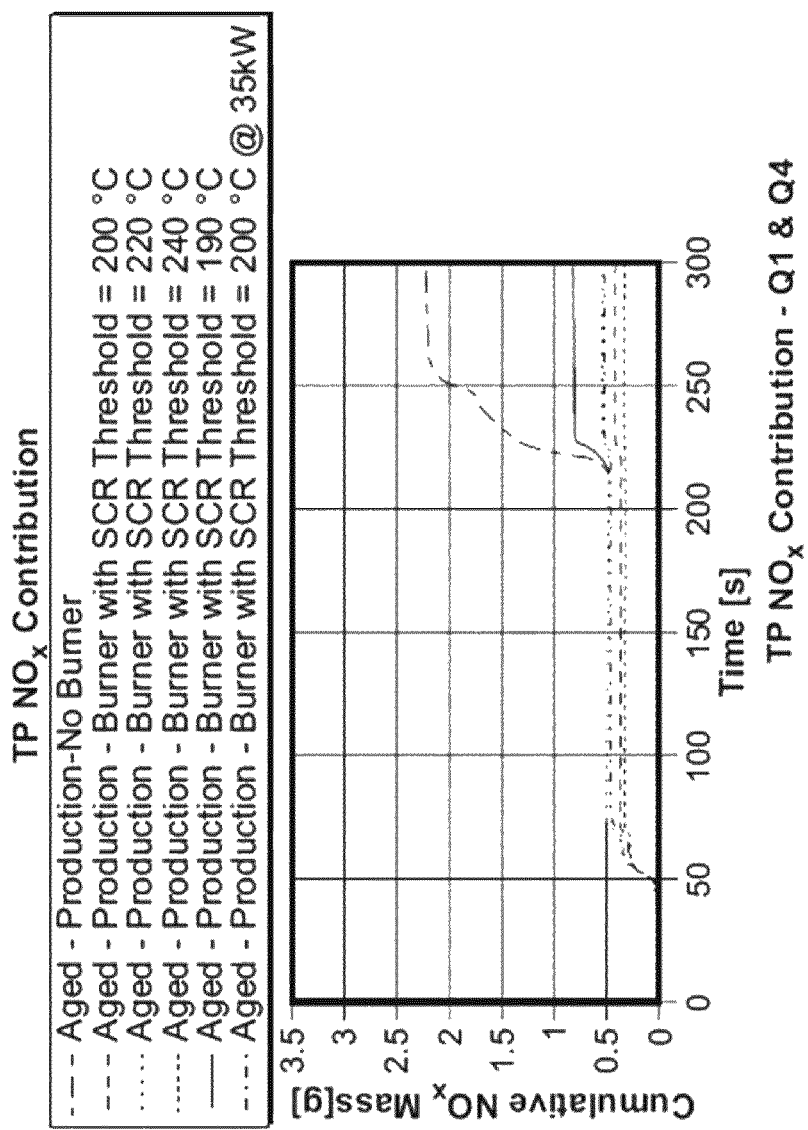
FIG. 6 shows a plot of cumulative $NO_x$ mass vs. time and a table summarizing tailpipe $NO_x$ contribution.

FIG. 6 shows a plot of cumulative $NO_x$ mass vs. time and a table summarizing tailpipe $NO_x$ contribution. The results in FIG. 6 (HOT FTPs) show, with the SCR setpoints of 190 to 240° C., that 48% to 74% of the total tailpipe $NO_x$ occurs in the first quarter of the FTP while less than 5% occurs in the fourth quarter. Since the $1^{st}$ and $4^{th}$ quarter are identical, the difference is a combination of SCR temperature and urea loading on the catalyst. This shows the potential of raising the SCR temperature early.

From the data, it can be seen that both the Cold and Hot FTP cycles benefit from an SCR inlet temperature setpoint of 300° C. (Tier 1). It can be possible to heat a Cold SCR to 240° C. after 400 seconds. In some cases, it can be possible to heat a Hot SCR to 240° C. in around 250 seconds. However, the DPF, as a heat sink, can only supply heat to the SCR for so long. Therefore, when the SCR drops below 240° C. around 400 seconds into the FTP cycle, it is possible to implement Tier 2 of the strategy. From this, it can be understood that it is possible to cease fuel or power to the exhaust heating device between Tiers 1 & 2. So, the transition from Tier 1 to Tier 2 can be instantaneous or it can comprise an un-powered lag. Such is also true for the transition from Tier 2 to Tier 3.

Multi-Tier Control Strategy

As an additional system & strategy, a multi-tier heater control strategy can be based on upstream catalyst temperature and downstream SCR temperature using an e-Heater in between. That is, the above 2-tier strategy can be expanded to a multi-tier strategy. The multi-tier control strategy based on upstream catalyst temperatures provides similar $NO_x$ emissions while reducing fuel consumption and $CO_2$ emissions.

Figure 7:
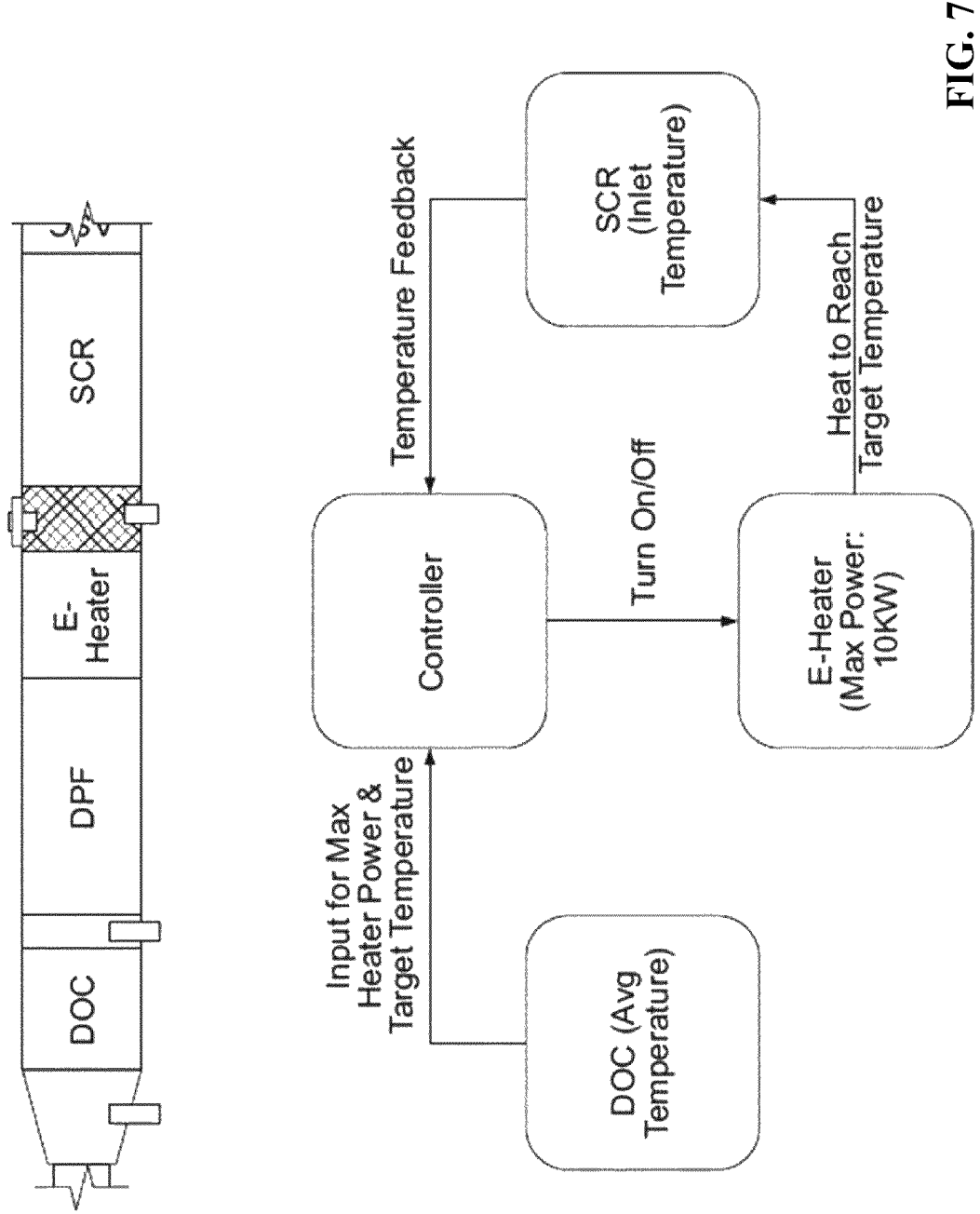
FIG. 7 illustrates an example method flow for a multi-tier heat up strategy with corresponding example aftertreatment system layout.

FIG. 7 illustrates an example method flow for a multi-tier heat up strategy with corresponding example aftertreatment system layout.

Part 1: Senses upstream DOC condition, which is upstream of the e-Heater, to predict any cold wave potential and eliminate it by raising the e-Heater power.

Part 2: Uses a control loop, similar to the 2-tier strategy of the e-Heater upstream of the SCR.

The combination of adding these together has yielded similar tailpipe $NO_x$ and much lower $CO_2$/fuel consumption.

The Multi-tier Temperature Control strategy can comprise aspects as follows.

Electric heating of the exhaust is important to keep SCR temperatures in a functioning range so that $NO_x$ conversion is high. To reduce the impact of power generation on fuel consumption and $CO_2$, strategies can be improved to control the exhaust heating device rather than just a standard PID control. A high-level approach would be running a thermal model of the AT system to determine the proper amount of heat. Thermal models can consume significant computational effort. So, instead, a multi-tier control strategy based on upstream catalyst temperatures is used to provide similar $NO_x$ emissions while reducing fuel consumption and $CO_2$ emissions.

Limiting the maximum heater power helps to limit fuel consumption and $CO_2$ generation. Unfortunately, when the power is limited, there may be conditions where the upstream components are cold, and a cold wave of exhaust gas causes the SCR to drop below maximum temperature because the heater cannot compensate due to the maximum power limitations.

Figure 8:
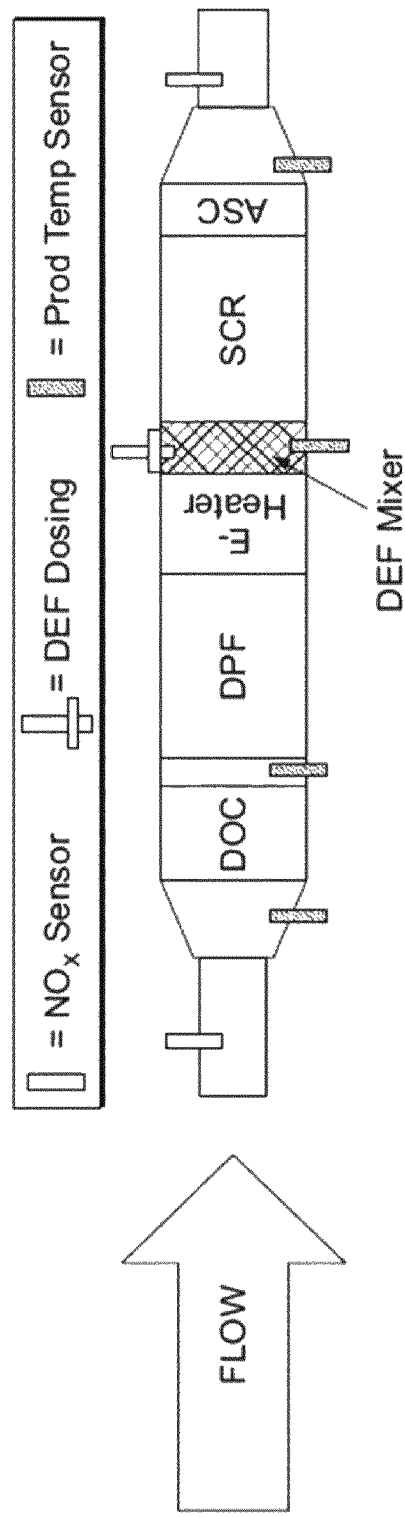
FIG. 8 illustrates flow direction downstream an example aftertreatment system.

FIG. 8 illustrates flow direction downstream an example aftertreatment system.

Maximum heater power and the setpoint control temperature can be based on the average DOC temperature [(in+out)/2]. When the temperatures are colder, a higher heater power is allowed, and a higher target SCR inlet temperature is imposed. As upstream AT temperatures increase, then the heater maximum temperature and the setpoint can be reduced.

The Multi-tier strategy has two parts:

Part 1: Senses upstream DOC condition, which is upstream of the e-Heater, to predict any cold wave potential and eliminate it by raising the e-Heater power.

Part 2: Uses a control loop, implementing techniques similar to the 2-tier strategy of the e-Heater upstream of the SCR.

The combination of adding these together has yielded similar tailpipe $NO_x$ and much lower $CO_2$/fuel consumption The multi-tier can be adapted to more engine operation modes (because it has more control levers) and to various engines and starting conditions.

The multi-tier, in some instances, can use the 2-tier strategy between the e-Heater and SCR while adding the upstream temperature sensing of the DOC in front of the e-Heater to sense a future state condition such as a cold wave.

The system and strategy can comprise a higher maximum power when catalysts are cold to eliminate the cold wave effect and can transition to less power for normal operation.

This control algorithm can be used instead of a more complicated model-based controller as it has few table entries for calibrating the system.

Figure 9:
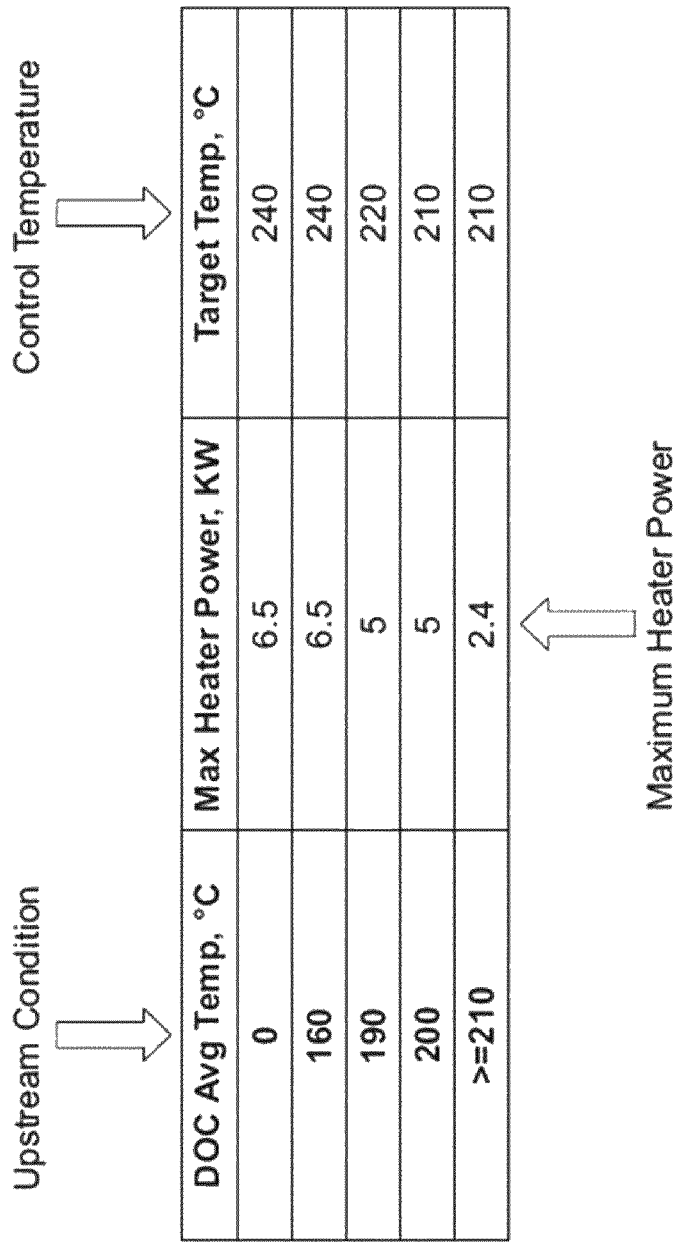
FIG. 9 illustrates a table of example average aftertreatment system upstream conditions, max heater power, and target temperature.

FIG. 9 illustrates a table of example average aftertreatment system upstream conditions, max heater power, and target temperature.

Figure 10:
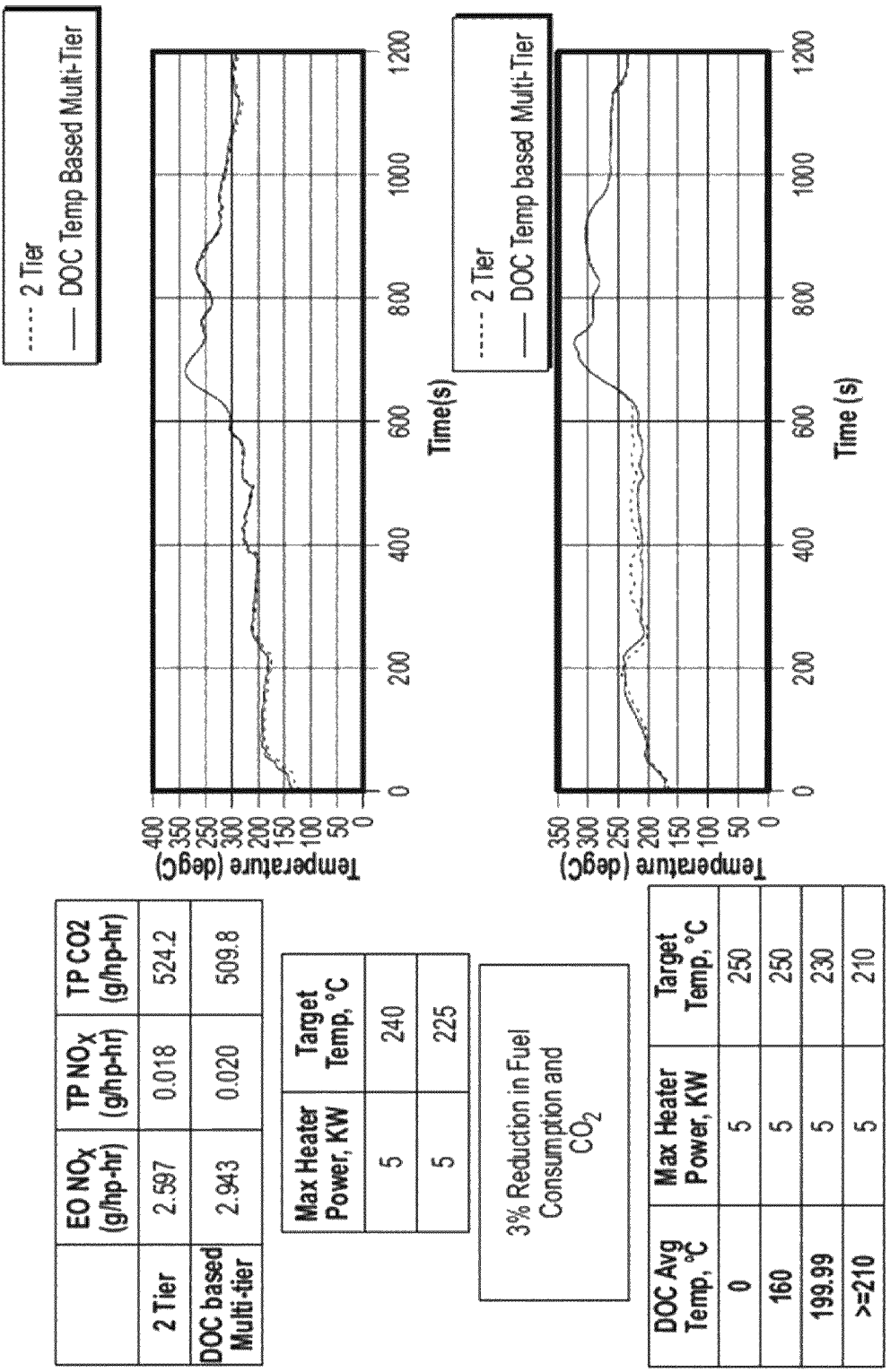
FIG. 10 shows plots and tables comparing a 2-tier aftertreatment heat up strategy against a multi-tier aftertreatment heat up strategy for a FTP cycle.

FIG. 10 shows plots and tables comparing a 2-tier aftertreatment heat up strategy against a multi-tier aftertreatment heat up strategy for a FTP cycle. FIG. 10 illustrates comparisons of the 2-tier strategy against the multi-tier strategy for the FTP cycle.

Figure 11:
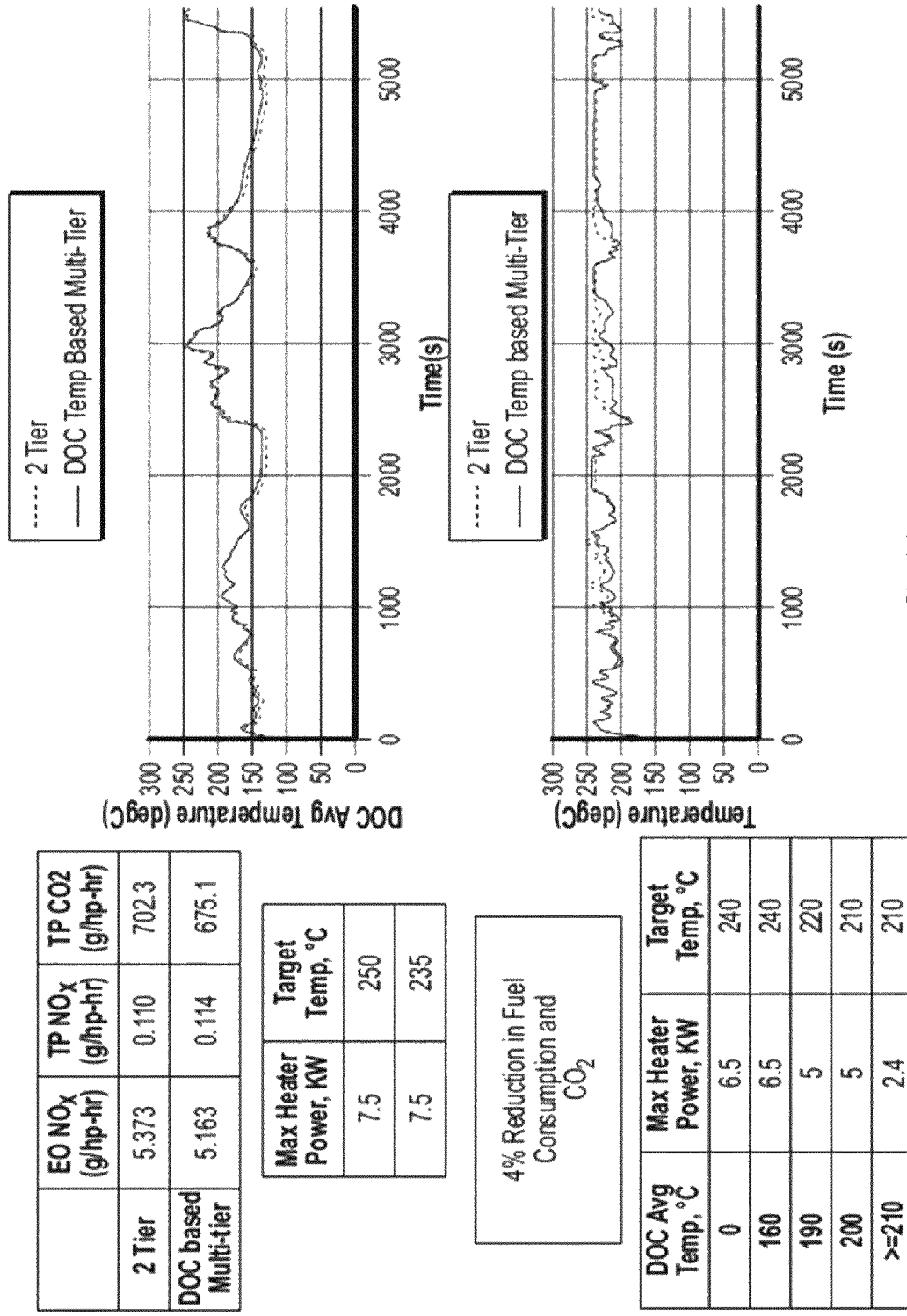
FIG. 11 shows plots and tables comparing a 2-tier aftertreatment heat up strategy against a multi-tier aftertreatment heat up strategy for a low load cycle.

FIG. 11 shows plots and tables comparing a 2-tier aftertreatment heat up strategy against a multi-tier aftertreatment heat up strategy for a low load cycle. FIG. 11 illustrates comparisons of the 2-tier strategy against the multi-tier strategy for a low load cycle.

The multi-tier strategy permits the prediction and or detection of cold waves as they propagate through the exhaust system. Therefore, an upstream or other sensor can receive data that the exhaust or exhaust system component is getting cold. Or, an operation mode selection, such as coasting or low load, causes a prediction of cool off. Then, a setpoint can be chosen to buffer or counteract the cold wave. Then a tier that is not a Tier 1 cold start heat up can be selected. An intermediate setpoint can be selected that is neither the Tier 1 cold start heat up nor the Tier 2 setpoint. It could be a Tier 3 setpoint or another setpoint. Each engine operating mode could have its own setpoint in the multi-Tier strategy, with a transition from fast-heat up and idle temperature maintenance (Tiers 1 & 2) to a non-idle or loaded idle setpoint.

What is claimed is:
1. A method of controlling temperature of an engine aftertreatment system, comprising:

directing an exhaust heating device in an engine aftertreatment system to apply heat to the engine aftertreatment system;

opening at least one of one or more intake valves and one or more exhaust valves of an engine coupled to the engine aftertreatment system; and pulsing, by an engine starter of the engine, the engine on and off to generate airflow from the engine that moves the applied heat from the exhaust heating device downstream the engine aftertreatment system.

2. The method of claim 1, further comprising:

before pulsing the engine to generate airflow from the engine that moves the applied heat from the exhaust heating device downstream the engine aftertreatment system, eliminating engine fueling of the engine.

3. The method of claim 1, wherein the engine starter is an air starter.

4. The method of claim 1, wherein the engine starter is an electric motor.

5. The method of claim 1, wherein the engine starter is an engine starter of a hybrid vehicle.

6. The method of claim 1, wherein pulsing the engine to generate airflow from the engine that moves the applied heat from the exhaust heating device downstream the engine aftertreatment system pulses the engine at an engine starting speed.

7. The method of claim 6, wherein the engine starting speed spins the engine in a range of 120-150 RPMs.

8. The method of claim 6, wherein the engine starting speed spins the engine in a range of 100-200 RPMs.

9. The method of claim 1, wherein pulsing the engine comprises: pulsing the engine at a desired starting speed for 5 to 10 seconds every minute for a period of time.

10. The method of claim 1, wherein directing the exhaust heating device in the engine aftertreatment system to apply heat to the engine aftertreatment system further comprises applying heat using a first temperature setpoint.

11. The method of claim 10, wherein the heat applied at the first temperature setpoint is applied at a selective catalytic reduction (SCR) device mid-bed or a diesel particulate filter (DPF) outlet.

12. The method of claim 10, further comprising:

while applying the heat at the first temperature setpoint, receiving temperature data from a temperature sensor proximate to a selective catalytic reduction (SCR) device in the engine aftertreatment system;

determining from the temperature data that a first temperature is at a first threshold temperature which is less than the first temperature setpoint; and after determining that the first temperature is at the first threshold temperature, directing the exhaust heating device to apply heat using a second temperature setpoint which is less than the first temperature setpoint.

13. The method of claim 12, wherein the second temperature setpoint is 200° C.

14. The method of claim 12, wherein the exhaust heating device is upstream from the SCR device.

15. The method of claim 14, wherein the SCR device is a light-off SCR (LO-SCR).

16. The method of claim 14, wherein the SCR device is a primary SCR.

17. The method of claim 1, wherein the engine starter is powered by a battery.

18. The method of claim 1, wherein the exhaust heating device is an electric heater.

19. The method of claim 1, wherein the exhaust heating device is a fuel burner.

* * * * *